US012037826B2

(12) United States Patent
Lin et al.

(10) Patent No.: US 12,037,826 B2
(45) Date of Patent: Jul. 16, 2024

(54) HINGE

(71) Applicant: FOSITEK CORPORATION, New Taipei (TW)

(72) Inventors: Kuan-Yu Lin, New Taipei (TW); Hsiu-Fan Ho, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/095,919

(22) Filed: Jan. 11, 2023

(65) Prior Publication Data

US 2024/0151085 A1 May 9, 2024

(30) Foreign Application Priority Data

Nov. 4, 2022 (TW) ................................ 111142306

(51) Int. Cl.
*E05D 11/10* (2006.01)
*E05D 3/04* (2006.01)

(52) U.S. Cl.
CPC ............ *E05D 11/1014* (2013.01); *E05D 3/04* (2013.01); *E05D 11/1028* (2013.01)

(58) Field of Classification Search
CPC ....... E05D 11/06; E05D 11/08; E05D 11/082; E05D 11/084; E05D 11/10; E05D 11/105;
(Continued)

(56) References Cited

U.S. PATENT DOCUMENTS 5,361,455 A * 11/1994 Kiefer ...................... E05D 7/04 16/272
5,611,114 A 3/1997 Wood, Jr
6,018,847 A * 2/2000 Lu ......................... F16M 11/10 16/337

(Continued)

FOREIGN PATENT DOCUMENTS

CN 204326784 U 5/2015
CN 204590884 U 8/2015
CN 209637481 U 11/2019
CN 217420859 U * 9/2022
JP 2018001961 A * 1/2018

*Primary Examiner* — Chuck Y Mah

(74) *Attorney, Agent, or Firm* — Demian K. Jackson; Jackson IPG PLLC

(57) ABSTRACT

A hinge includes a first fixing bracket, a shaft and a swivel bracket. The first fixing bracket includes two first support pieces and a first connection piece. The two first support pieces are arranged in parallel to each other, and the first connection piece is connected to the two second support pieces. The two first support pieces are respectively provided with a shaft hole and the shaft holes are arranged coaxially along a central axis. At least one of the first support pieces is provided with one limiting extension portion extending in a direction in parallel to the central axis at an upper front end of the first support piece and extending towards the other first support piece. The shaft is inserted into the shaft hole. The swivel bracket includes a mounting plate; an extension plate extending from a bottom edge of the mounting plate and bent towards a side corresponding to the inner surface of the mounting plate; at least one sleeve piece located between the two first support pieces, extending from an end of the extension plate away from the bottom edge, and bent and wound towards the side corresponding to the inner surface. The sleeve piece is configured to be sleeved over the shaft, such that the swivel bracket can rotate with respect to the first fixing bracket. When the swivel bracket is flipped outwards with respect to the first fixing bracket, the extension plate moves towards the limiting extension portion.

13 Claims, 10 Drawing Sheets

(58) Field of Classification Search
CPC ............. E05D 11/1014; E05D 11/1028; E05D 11/1064; E05D 11/2007; E05D 2011/1035; E05D 2003/025; E05D 3/02; E05D 3/04; E05D 5/0215; E05D 5/065; E05D 7/081; E05D 7/123; E05D 7/125; E05Y 2201/638; E05Y 2201/254; E05Y 2201/256; E05Y 2800/298; E05Y 2900/132; E05Y 2900/134; E05Y 2900/20; E05Y 2900/31; E05Y 2900/312; E05Y 2900/614; E05F 3/14; E05F 3/16; E05F 3/20; E05F 5/04; F16C 11/103; A47K 13/12; F05F 2005/046
See application file for complete search history.

(56) References Cited

U.S. PATENT DOCUMENTS

| | | | | |
|---|---|---|---|---|
| 6,701,577 | B1 * | 3/2004 | Yeh | A47J 36/12 16/376 |
| 6,718,596 | B2 * | 4/2004 | Kohlstrand | E05D 5/062 16/374 |
| 7,114,219 | B2 * | 10/2006 | Kiefer | E05D 5/062 16/374 |
| 2004/0034966 | A1 * | 2/2004 | Wegman | E05D 7/12 16/254 |
| 2006/0059662 | A1 * | 3/2006 | Roeper | E05D 9/00 16/382 |
| 2008/0168622 | A1 * | 7/2008 | Hsu | F16M 11/10 16/382 |
| 2023/0358085 | A1 * | 11/2023 | Bonvissuto | E05B 17/2088 |

* cited by examiner

HINGE

CROSS-REFERENCE TO RELATED APPLICATIONS

This non-provisional application claims priority claim under 35 U.S.C. § 119(a) on Taiwan Patent Application No. 111142306 filed Nov. 4, 2022, the entire contents of which are hereby incorporated by reference.

BACKGROUND

Technical Field

This disclosure relates to a hinge, and in particular, to hinge with a simple structure and a small volume.

Related Art

A hinge structure is used to pivot a door panel to an edge of an opening of a case, such that the door panel can be flipped outward or closed to seal the case.

Usually, the hinge structure is unable to provide a restriction on the angle of flip of the door panel, and an additional angular limitation structure is required. However, an angular limitation structure usually becomes a protruding structure on the case, and through hole on the door panel is required to receive the angular limitation structure, such that it is difficult to maintain the smooth appearance of the door panel. The additional angular limitation structure also increases the complexity of the overall structure, which in turn increases the difficulty of assembly and manufacturing costs.

In addition, when the door panel is closed to the case to seal the opening, the door panel and the case are combined by an additional snap mechanism to keep the door panel closed. However, when the door is flipped outward, the door panel is not fixed in the rotational direction, which makes the door panel easily shake in the opened state.

SUMMARY

In view of the above problems, this disclosure provides a hinge with a simple structure and a small volume and is easy to be assembled and manufactured.

This disclosure provides a hinge including a first fixing bracket, a shaft, and a swivel bracket. The first fixing bracket includes two first support pieces and a first connection piece. The two first support pieces are arranged in parallel to each other, and the first connection piece is connected to the two first support pieces. The two first support pieces are respectively provided with a shaft hole and the two shaft holes are arranged coaxially along a central axis. At least one of the first support pieces is provided with a limiting extension portion extending in a direction in parallel to the central axis at an upper front end of the first support piece and extending towards the other first support piece. The shaft is inserted into the shaft holes to pass through the two first support piece. The swivel bracket includes a mounting plate, an extension plate, and at least one sleeve piece. The mounting plate includes an inner surface, an outer surface, and a bottom edge. The extension plate extends from the bottom edge of the mounting plate and is bent towards a side corresponding to the inner surface. The at least one sleeve piece is located between the two first support pieces, extends from an end of the extension plate away from the bottom edge, and is bent and wound towards the side corresponding to the inner surface. The sleeve piece is configured to be sleeved over the shaft, such that the swivel bracket can rotate with respect to the first fixing bracket. When the swivel bracket is flipped outwards with respect to the first fixing bracket, the extension plate moves towards the limiting extension portion.

In at least one embodiment, the first connection piece is perpendicular to the two first support piece and connected to a rear edge of the two second support pieces.

In at least one embodiment, the limiting extension portion is located on an outer side of the central axis with respect to that central axis.

In at least one embodiment, each of the two first support pieces is provided with one limiting extension portion and the two limiting extension portions respectively extend towards the other first support piece.

In at least one embodiment, the hinge further includes at least one second fixing bracket combined with the first fixing bracket; wherein the at least one second fixing bracket includes two second support pieces and a second connection piece; the two second support pieces are arranged in parallel, and the second connection piece is connected to the two second support pieces; wherein one of the two second support pieces is adjacent to one of the first support pieces.

In at least one embodiment, each of the two second support pieces is respectively provided with a shaft hole and the shaft holes of the second support pieces are arranged coaxially with the shaft holes of the two first support pieces; and the shaft is also inserted into the shaft holes of the two second support pieces.

In at least one embodiment, the swivel bracket includes a plurality of extension plates with a plurality of corresponding sleeve pieces; each of the extension plates are arranged in parallel to each other and extends from the bottom edge, and each of the sleeve pieces extends from an end of the corresponding extension plate away from the bottom edge; and each of the sleeve pieces is respectively located between the two first support pieces, or located between the two second support pieces, and the sleeve piece is configured to be sleeved over the shaft.

In at least one embodiment, an open slot is formed between two adjacent ones of the extension plates, and the open slot is configured for the insertion of the first support piece and the second support piece adjacent to each other.

In at least one embodiment, at least one of the first support pieces or at least one of the second support pieces is provided with at least one snap groove at an edge of the first support piece or the second support piece, and the at least one snap groove is arranged corresponding to a lateral edge of the extension plate; when the swivel bracket is flipped outwards to a predetermined angle, the lateral edge of the at least one extension plate is snapped into the at least one snap groove.

In at least one embodiment, the first fixing bracket includes at least one horizontal fixing piece, extending from a bottom of one of the first support pieces and extending towards an outer side of the first fixing bracket. wherein the second connection piece of the second fixing bracket is configured to be fixed to the at least one horizontal fixing piece.

In at least one embodiment, the second connection piece is connected to the two second support pieces, extends from a bottom of the two second support pieces, and is arranged in parallel to the at least one horizontal fixing piece.

In at least one embodiment, when the swivel bracket is closed to the first fixing bracket, the mounting plate abuts against a top portion of the two first support pieces.

In at least one embodiment, the first fixing bracket includes two horizontal fixing pieces, extending from a bottom of each of the two first support pieces and the two horizontal fixing pieces extend away from each other and extend towards outer sides of the first fixing bracket.

Through the above technical solution, the hinge of this disclosure has the feature of simple structure and small volume, which is conducive to reducing the production cost. In addition, this positioning or angular limitation structure is configured on the inner surface of the mounting plate or disposed in the accommodation area. The angular limitation structure will not become a protruding structure on the outer surface of the mounting plate, which facilitates the installation of the mounting plate onto the door panel.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
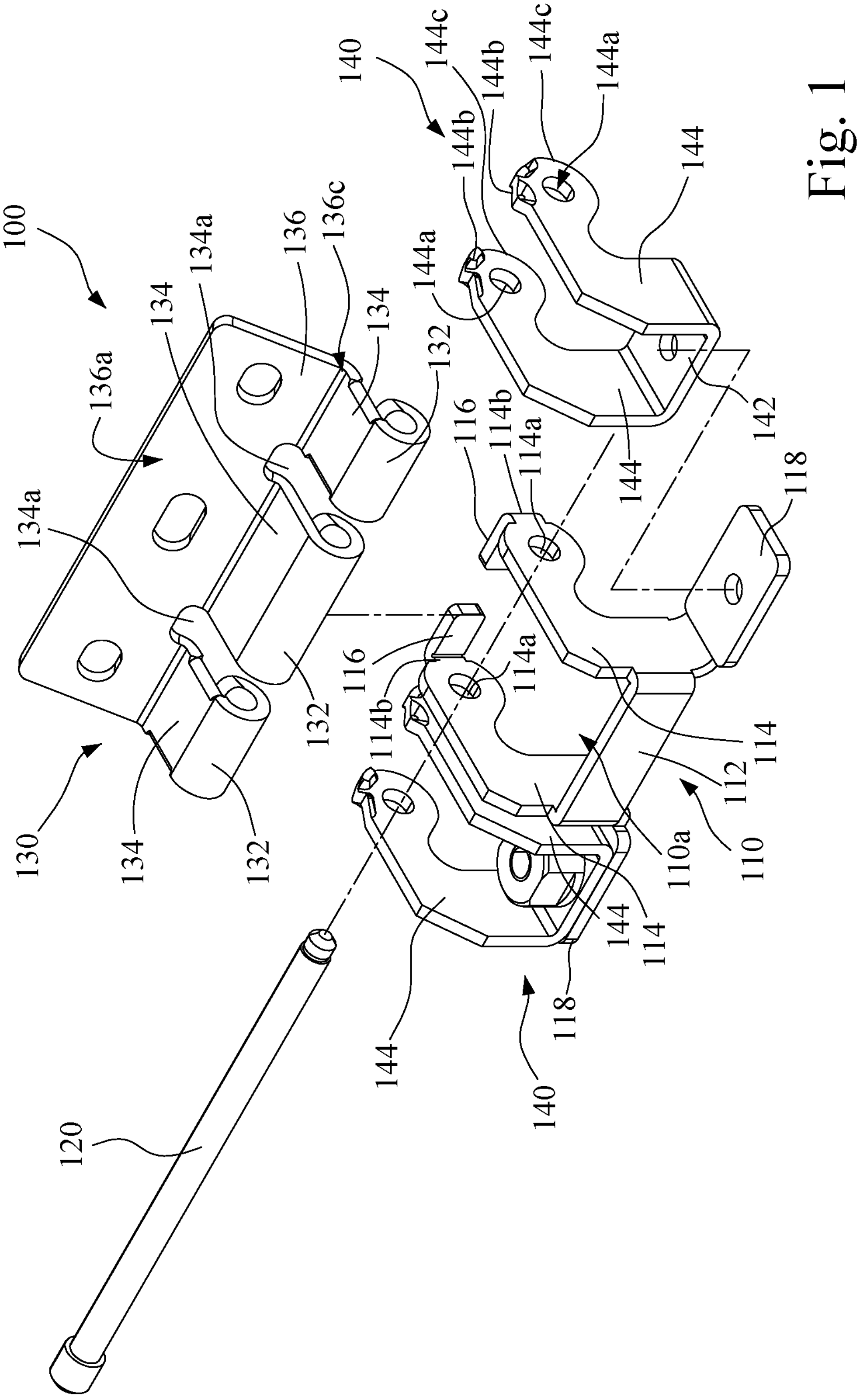
FIG. 1 is an exploded view of a hinge according to an embodiment of this disclosure.

Please refer to FIG. 1 to FIG. 5, a hinge 100 according to an embodiment of this disclosure including a first fixing bracket 110, a shaft 120 and a swivel bracket 130. As shown in FIG. 2 to FIG. 5, the hinge 100 can be set individually, or plural hinges 100 can be set on a same axis. The hinge 100 is used to connect two objects, so that the two objects can be opened and closed relative to each other. For example, the two objects are a case 210 and a door panel 220, and the hinge 100 is configured to pivot the door panel 220 to the case 210. The first fixing bracket 110 and the swivel bracket 130 are respectively connected to one of the case 210 and the door panel 220. The connection between the case 210 and the door panel 220 is not limited to one hinge 100, the connection can be made with more than two hinges 100.

As shown in FIG. 1 to FIG. 5, The first fixing bracket 110 is configured to be disposed on a placement plane P. The placement plane P is configured to be a part of a surface of the case 210, and the first fixing bracket 110 is configured to be disposed on an edge of the opening 211 of the case 210. Alternatively, the first fixing bracket 110 is configured to be a part of the case 210 and is located on the placement plane P defined by the surface of the case 210. And the first fixing bracket 110 is located at the edge of the opening 211.

As shown in FIG. 1, FIG. 2, FIG. 4, and FIG. 5, The first fixing bracket 110 includes two first support pieces 114 and a first connection piece 112. The two first support pieces 114 are arranged in parallel to each other, and the first connection piece 112 is connected to the two first support pieces 114, such that the two first support pieces 114 are combined through the first connection piece 112.

Specifically, the two first support pieces 114 are configured to be vertically fixed to the placement plane P, the first connection piece 112 is perpendicular to the two first support pieces 114, and the first connection piece 112 is connected to rear edges of the two second support pieces 114. Therefore, the first connection piece 112 is also perpendicular to the placement plane P. A spacing distance exists between the two first support pieces 114, so as to define an accommodation area 110*a* between the two first support pieces 114. The two first support pieces 114 are respectively provided with a shaft hole 114*a*, the two shaft holes 114*a* respectively pass through the two first support pieces 114 and the two shaft holes 114*a* are arranged coaxially along a central axis. The first fixing bracket 110 is made by stamping a metal sheet, so that the two second support pieces 114 are bent over two ends of the first connection piece 112.

The first fixing bracket 110 can be made by a single metal sheet, or made by combining plural metal sheets. The plural metal sheets can be combined by rivets or a combination of screws and bolts. The most simplified first fixing bracket 110 is a single piece including one first connection piece 112 and two first support piece 114 formed in one piece.

Figure 2:
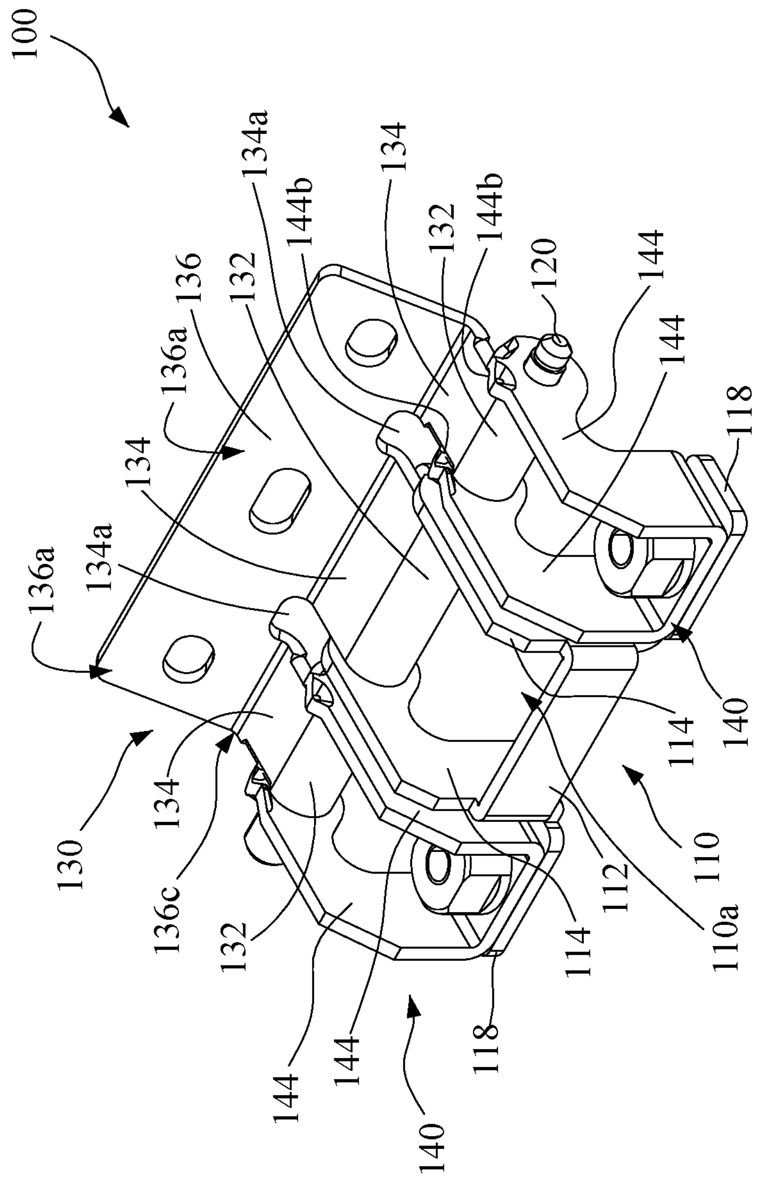
FIG. 2 is a perspective view of the hinge according to the embodiment of this disclosure.
Figure 3:
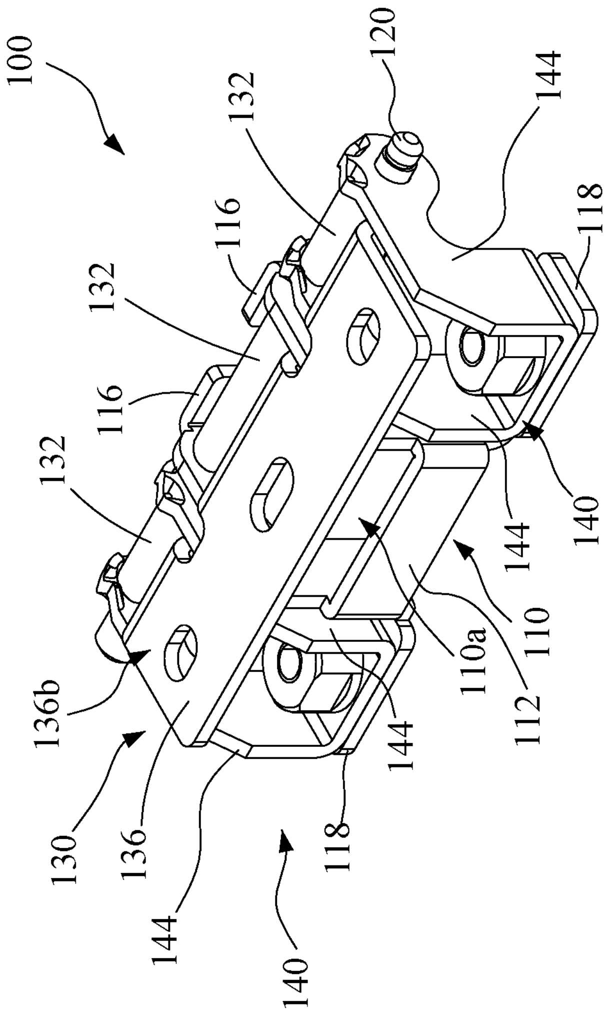
FIG. 3 is another perspective view of the hinge according to the embodiment of this disclosure.

As shown in FIG. 1, FIG. 2 and FIG. 3, At least one of the first support pieces 114 is provided with a limiting extension portion 116 extending in a direction in parallel to the central axis of the shaft hole 114*a* at an upper front end 114*b* of the first support piece 114, and extending towards the other first support piece 114. the limiting extension portion 116 is located on an outer side of the central axis of the shaft hole 114*a* with respect to that central axis, to stay away from the first connection piece 112. In at least one embodiment of this disclosure, each of the two first support pieces 114 is provided with one limiting extension portion 116, and each of the limiting extension portions 116 extends towards the other first support piece 114; that is, the two limiting extension portions 116 extend towards each other.

As shown in FIG. 1 to FIG. 5, the shaft 120 can be made of highly rigid material such as stainless steel. The shaft 120 is inserted into the two shaft holes 114*a* and passes through the two first support pieces 114 and passes through the accommodation area 110*a*.

As shown in FIG. 1 to FIG. 5, the swivel bracket 130 includes a mounting plate 136, one or more extension plates 134, and one or more sleeve pieces 132. Specifically, the swivel bracket 130 is made by stamping a metal sheet, so that the extension plate 134 and the mounting plate 136 are substantially in the form of a stamped sheets, and the sleeve piece 132 is wound to be tubular.

As shown in FIG. 1 to FIG. 5, The mounting plate 136 includes an inner surface 136*a*, an outer surface 136*b*, and a bottom edge 136*c*. The extension plate 134 extends from the bottom edge 136*c* of the mounting plate 136 and is bent towards a side corresponding to the inner surface 136*a*. At least one of the sleeve pieces 132 is located between the two first support pieces 114; that is, this sleeve piece 132 is located in the accommodation area 110*a*. The sleeve piece 132 extends from an end of the extension plate 134 away from the bottom edge 136*c*, and sleeve piece 132 is wound towards the side corresponding to the inner surface 136*a* to form a sleeve hole 132*a*. The sleeve piece 132 is configured to be sleeved over the shaft 120; that is, the shaft 120 is inserted into the sleeve hole 132*a*, such that the swivel bracket 130 can rotate with respect to the first fixing bracket 110.

The sleeve piece 132 and the shaft 120 are combined in a rotatable manner, such that the swivel bracket 130 can rotate with respect to the first fixing bracket 110. Alternatively, the sleeve piece 132 and shaft 120 are combined in a fixed manner, and the shaft 120 and the first support piece 114 are combined in a rotatable manner, such that the swivel bracket 130 can rotate with respect to the first fixing bracket 110. A bent angle is formed between the extension plate 134 and the mounting plate 136, such that the mounting plate 136 can abut against top portions of the two first support pieces 114. In addition, A width of the extension plate 134 is equaled to or smaller than a distance between the two first support pieces 114, such that the extension plate 134 can be received into the accommodation area 110*a* between the two first support pieces 114.

The sleeve piece 132 and the mounting plate 136 are structures extending from the extension plate 134, which can simplify structure of the swivel bracket 130 and reduce the manufacturing cost. The extension plate 134 is bent towards the first fixing bracket 110, such that the extension plate 134 and the sleeve pieces 132 can be received into the accommodation area 110*a* between the two first support pieces 114. The extension plate 134 and the sleeve pieces 132 do not become protruding structure on the outer surface of the mounting plate 136, which facilitates the installation of the mounting plate 136 onto the door panel 220.

Figure 4:
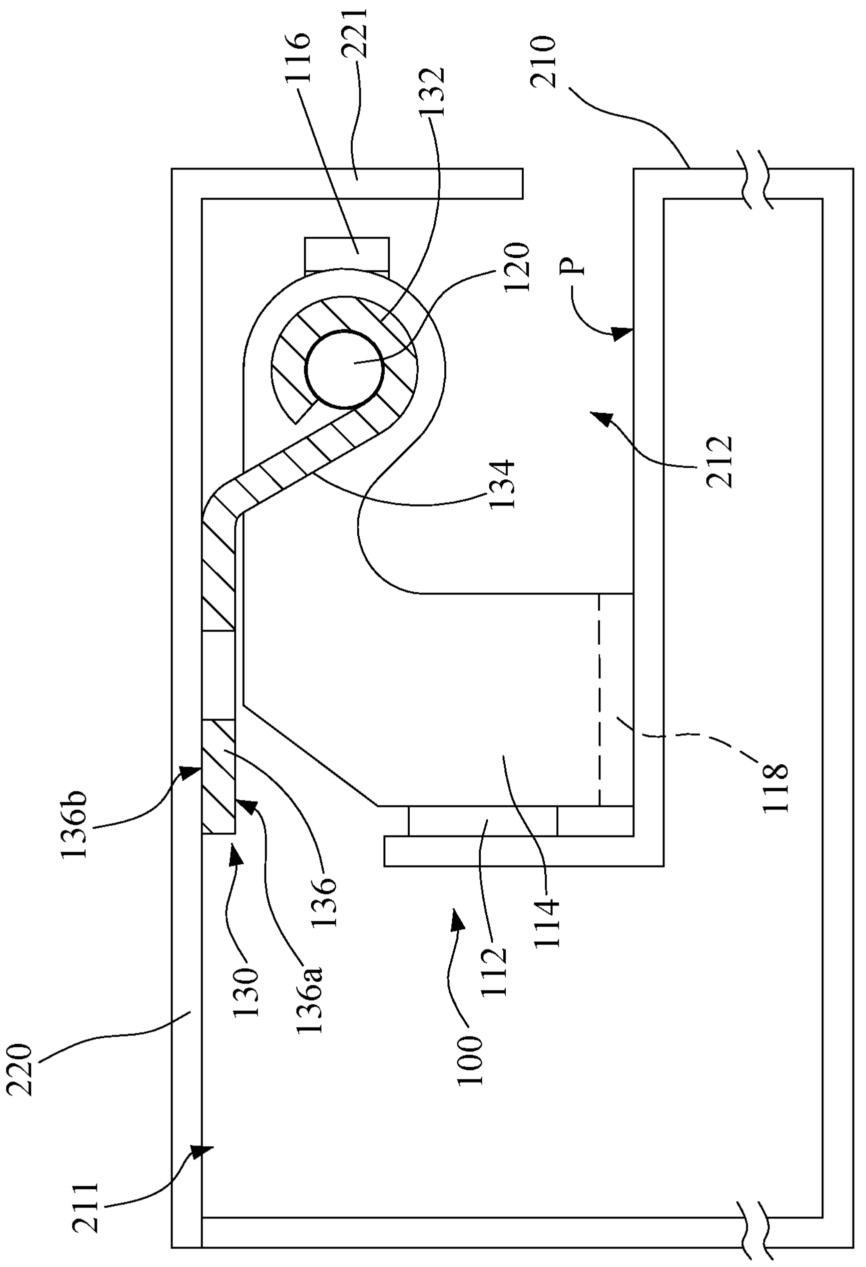
FIG. 4 is a cross-sectional view of the hinge, a case, and a door panel according to the embodiment of this disclosure, showing the door panel being closed.
Figure 5:
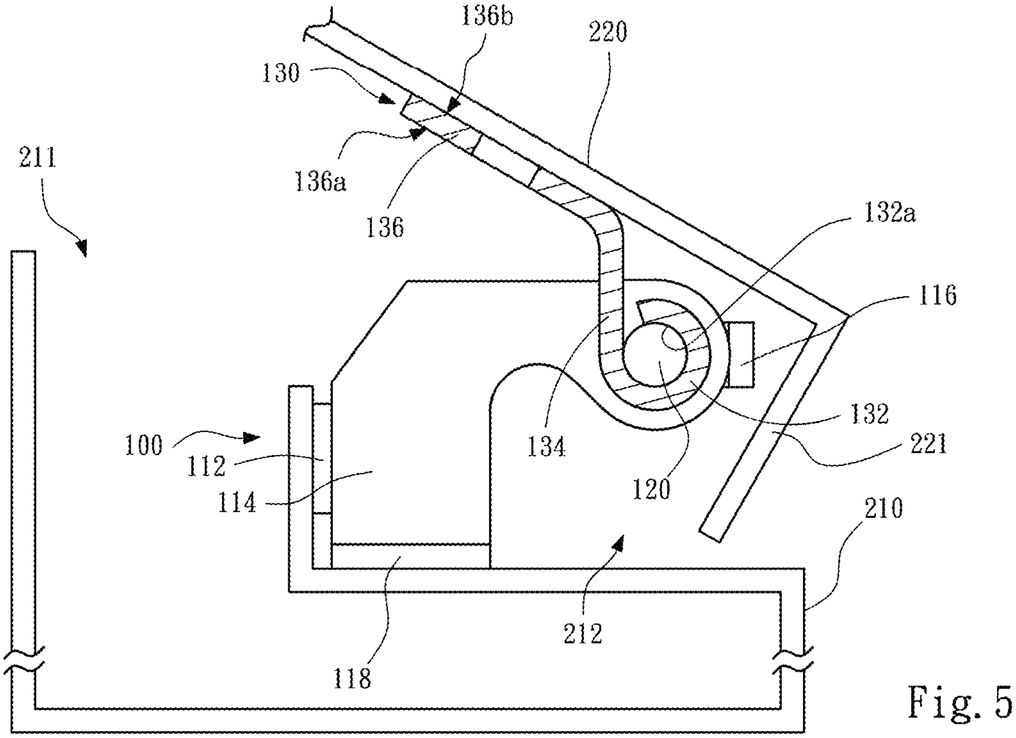
FIG. 5 is a cross-sectional view of the hinge, a case, and a door panel according to the embodiment of this disclosure, showing the door panel being flipped outward.
Figure 6:
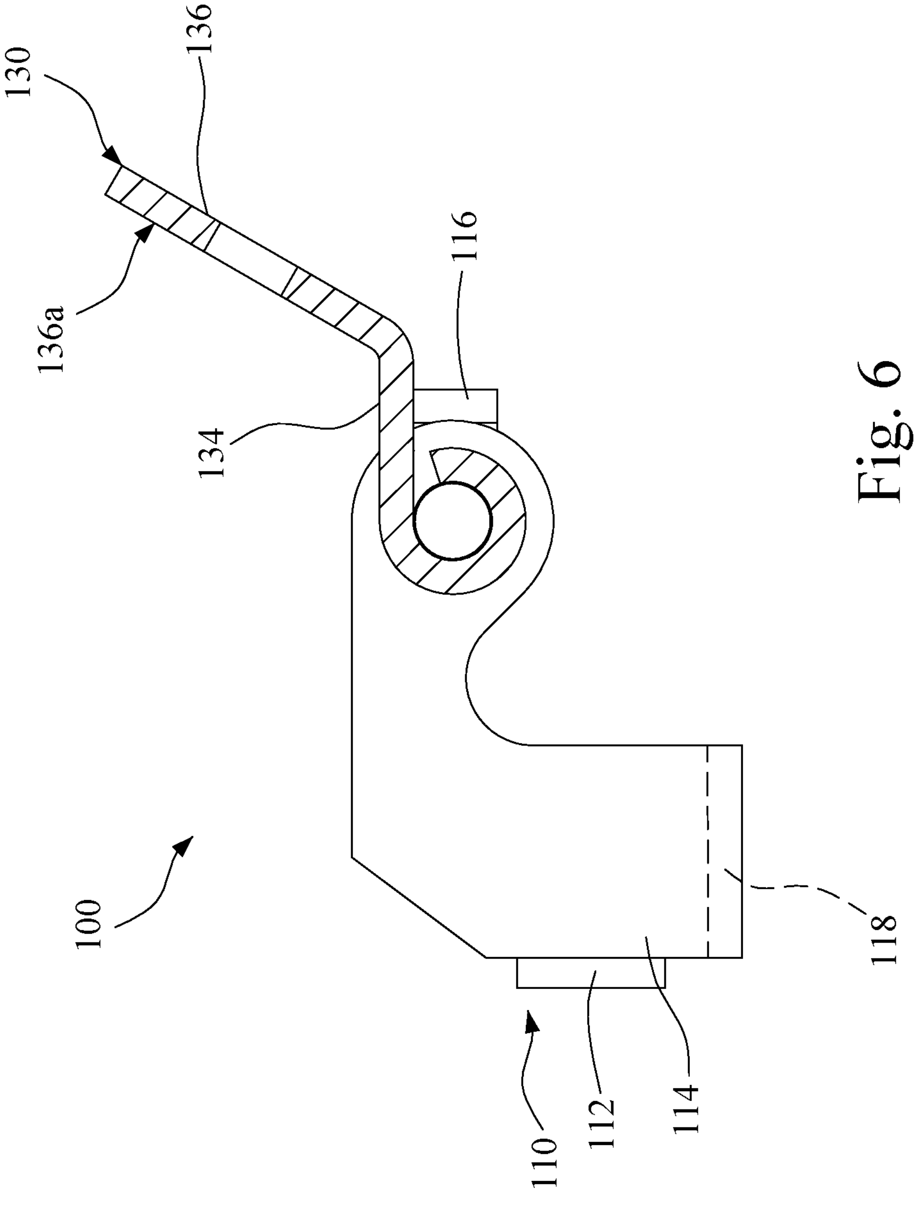
FIG. 6 is another cross-sectional view of the hinge according to the embodiment of this disclosure.

As shown in FIG. 4, FIG. 5, and FIG. 6, The swivel bracket 130 can be closed to the first fixing bracket 110, such that the mounting plate 136 can abut against top portions of the two first support pieces 114. Alternatively, the swivel bracket 130 can be flipped outwards with respect to the first fixing bracket 110, to form an included angle between the mounting plate 136 and the top portions of the two first support pieces 114. The outer surface of the mounting plate 136, i.e. the side of the mounting plate 136 away from the first fixing bracket 110, is configured to fix to an edge of the inner side of the door panel 220, such that the door panel 220 is pivoted to the case 210 by the hinge 100 to be flipped outwards, or to be closed to the case 210 to seal the opening 211.

As shown in FIG. 4 and FIG. 5, The opening 211 is provided on a front surface of the case 210, and the case 210 is provided with a recessed portion 212 on the front surface. The recessed portion 212 is located at the edge of the front surface and adjacent to the opening 211. The placement plane P is the bottom plane of the recessed portion 212. The side of the recessed portion 212 corresponding to the lateral side of the case 210 is open. A bottom of the first fixing bracket 110 is fixed to the recessed portion 212 by screwing, riveting, or welding, and the first fixing bracket 110 is located at the edge of the opening 211.

Specifically, as shown in FIG. 1, the first fixing bracket 110 includes a two horizontal fixing piece 118, The two horizontal fixing piece 118 respectively extend from the bottom of one of the first support pieces 114 and extend towards an outer side of the first fixing bracket 110. Meanwhile, the two horizontal fixing pieces 118 extend away from each other. The horizontal fixing pieces 118 are configured to be fixed on the placement plane P to fix the first fixing bracket 110 on the placement plane P. For example, in the aforementioned case 210, the horizontal fixing pieces 118 are configured to be fixed on the recessed portion 212 to fix the first fixing bracket 110 on the recessed portion 212. The horizontal fixing pieces can be fixed to the recessed portion 212 by screwing, riveting, or welding.

As shown in FIG. 4 and FIG. 5, The outer surface 136*b* of the mounting plate 136 is fixed to the edge of the inner side of the door panel 220, and the door panel 220 is further provided with a lateral baffle 221. The lateral baffle 221 extends in the direction of rear surface of the case 210, to shield the recessed portion 212 from the lateral surface of the case 210. The door panel 220 is fixed to the swivel bracket 130, and the swivel bracket 130 is combined with the first fixing bracket 110 in a rotatable manner, such that the door panel 220 is pivoted to the case 210 by the first fixing bracket 110 and the swivel bracket 130 to be flipped outward or to be closed to the case 210 to seal the opening 211.

As shown in FIG. 2 and FIG. 6, when the swivel bracket 130 is flipped outwards with respect to the first fixing bracket 110, the extension plate 134 moves towards the limiting extension portion 116. When the extension plate 134 abuts against the limiting extension portion 116, the angle at which the extension plate 134 is flipped outwards is limited to this maximum angle. For example, an included angle between the mounting plate 136 and the top portion of the two first support piece 114 is limited within 120 degrees, such that the angle at which the swivel bracket 130/door panel 220 is flipped outwards is limited to this angle of 120 degrees.

By changing the position of the limiting extension portion 116, or by changing the included angle between the mounting plate 136 and the first support piece 114, value of this maximum angle is also changed. For example, in FIG. 6 By moving the limiting extension portion 116 downwards or rightwards, value of this maximum angle is increased. Conversely, by moving the limiting extension portion 116 upwards or leftwards, value of this maximum angle is reduced. For example, by increasing the included angle between the mounting plate 136 and the top portion of the first support piece 114, value of this maximum angle is increased. Conversely, by reducing the included angle between the mounting plate 136 and the top portion of the first support piece 114, value of this maximum angle is reduced.

As shown in FIG. 3, FIG. 4, and FIG. 5, when the swivel bracket 130 is closed to the first fixing bracket 110, the mounting plate 136 can abut against a top portion of the two first support piece 114, such that the mounting plate 136 is positioned higher than the top portion of the first support piece 114. Therefore, structure of the first fixing bracket 110 does not protrude from the outer side of the mounting plate 136, which facilitates the installation of the mounting plate 136 onto the door panel 220.

As shown in FIG. 1, FIG. 2 and FIG. 3, the hinge 100 further includes two second fixing brackets 140 combined with the first fixing bracket 110. Each of the second fixing brackets 140 includes two second support pieces 144 and a second connection piece 142. The two second support pieces 144 are arranged in parallel, and the second connection piece 142 is connected to the two second support pieces 144. The second connection piece 142 is configured to be fixed to the horizontal fixing piece 118 of the first fixing bracket 110, so as to fix the second fixing bracket 140 to the first fixing bracket. Therefore, one of the two second support pieces 144 is disposed adjacent to one first support piece 114. Specifically, the second connection piece 142 is perpendicular to the two second support pieces 144 and extending from bottoms of the two second support pieces 144. And the second connection piece 142 is fixed to the horizontal fixing piece 118 in parallel, such that the second connection piece 142 is also in parallel to the placement plane P and the two second support pieces 144 are perpendicular to the placement plane P.

Each of the two second support pieces 144 is also provided with a shaft hole 144*a*, and the shaft holes 144*a* of the second support pieces 144 are arranged coaxially with the shaft holes 114*a* of the two first support pieces 114. The shaft 120 is also inserted into the shaft holes 144*a* of the two second support pieces 144. The second connection pieces 142 of the two second fixing bracket 140 are configured to be fixed to the two horizontal fixing pieces 118, so as to combine the second fixing brackets 140 to the first fixing bracket 110. The second connection pieces 142 can be combined with the horizontal fixing pieces 118 by screwing, riveting, or welding.

In conjunction with the second fixing bracket 140, the swivel bracket 130 includes a plurality of extension plates 134 with a plurality of corresponding sleeve pieces 132. Each of the sleeve pieces 132 is located between two first support pieces 114 or located between two second support pieces 144, and all the sleeve pieces 132 are configured to be sleeved over the shaft 120. An open slot 134*a* is formed between the two extension plates 134, and the open slot 134*a* is configured for the insertion of the first support piece 114 and the second support piece 144 adjacent to each other. Similarly, each of the extension plates 134 extends from the bottom edge 136*c* of the mounting plate 136, and each of the sleeve pieces 132 extends from an end of the extension plate 134 away from the bottom edge 136*c*.

Figure 7:
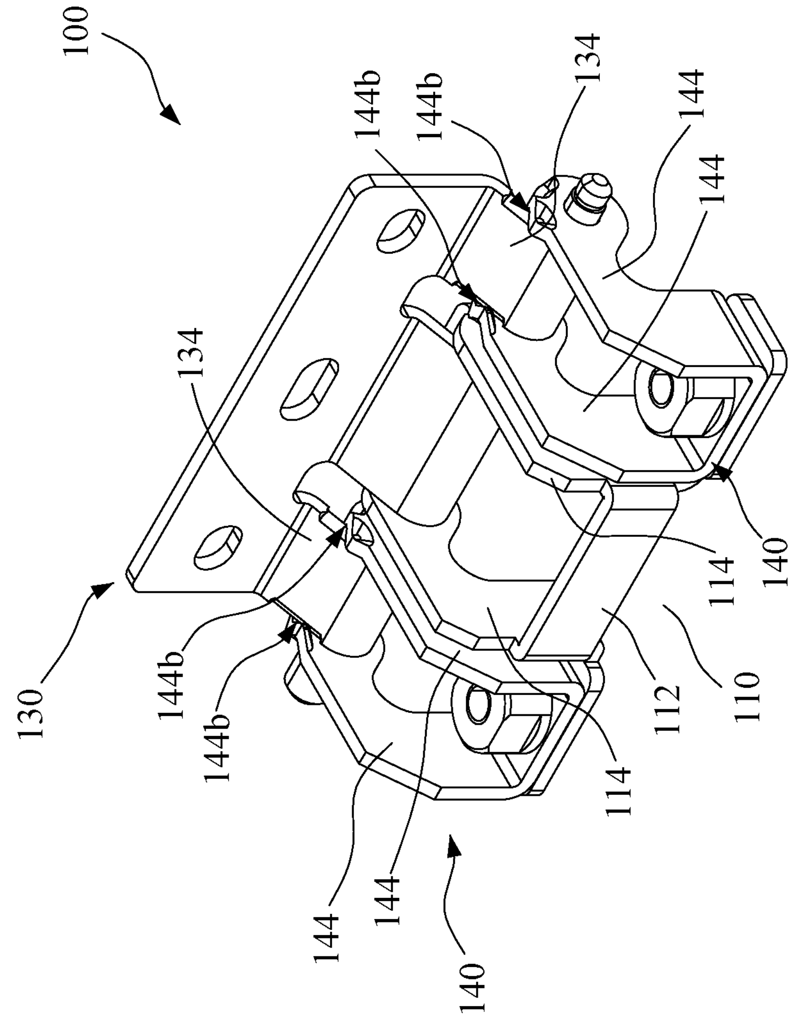
FIG. 7 is another perspective view of the hinge according to the embodiment of this disclosure.

As shown in FIG. 1, FIG. 2 and FIG. 7, At least one of the second support pieces 144 is provided with a snap groove 144*b* at an edge of the second support piece 144, and the snap groove 144*b* is arranged corresponding to a lateral edge of the extension plate 134.

Figure 8:
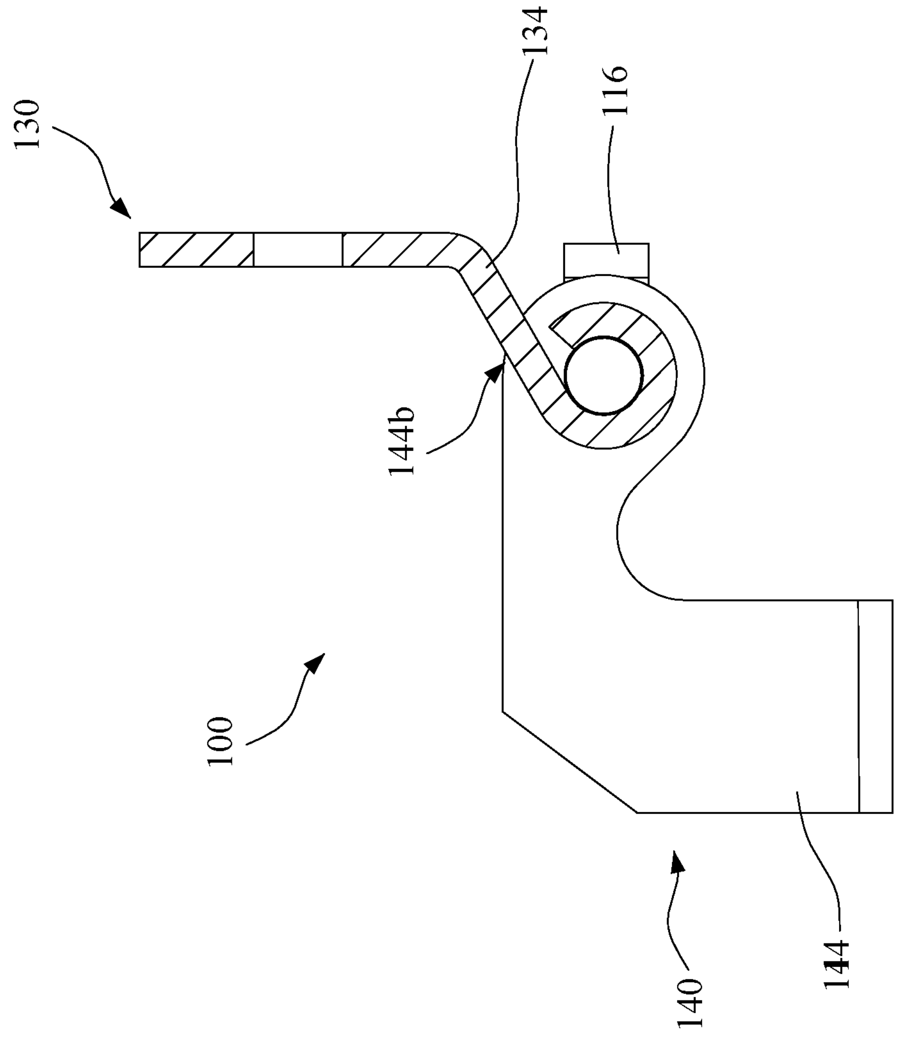
FIG. 8 is another cross-sectional view of the hinge according to the embodiment of this disclosure.
Figure 9:
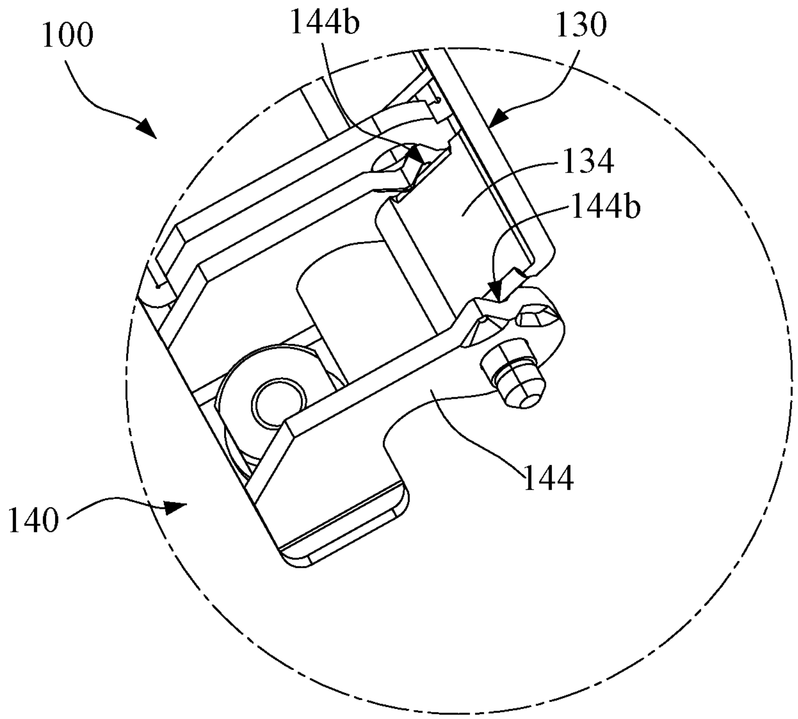
FIG. 9 is a partial perspective view of the hinge according to the embodiment of this disclosure.
Figure 10:
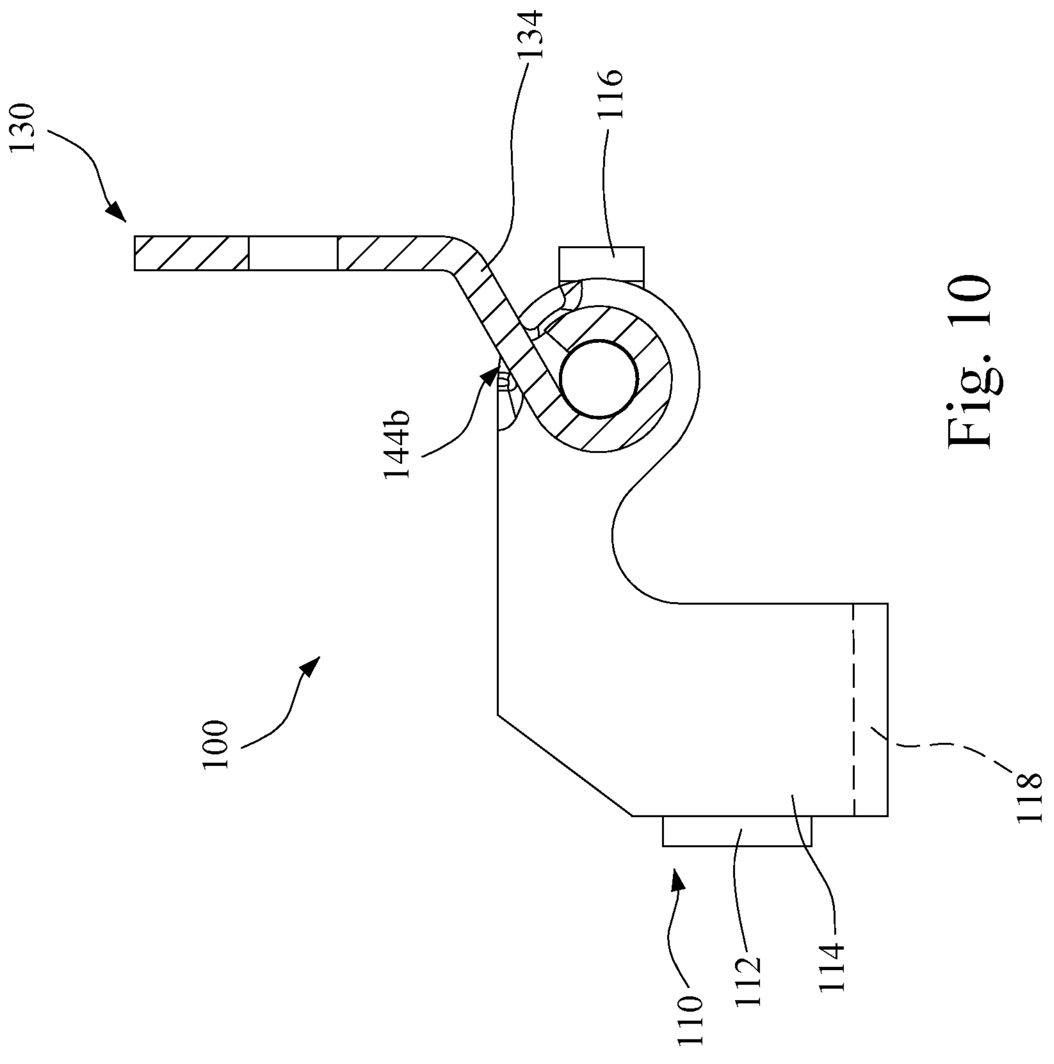
FIG. 10 is another cross-sectional view of the hinge according to the embodiment of this disclosure.

As shown in FIG. 7, FIG. 8, and FIG. 9, When the swivel bracket 130 is flipped outwards to a predetermined angle, e.g., 90 degrees, the lateral edge of the extension plate 134 is snapped into the snap groove 144*b*, so as to position the swivel bracket 130 at this predetermined angle. The snap groove 144*b* is formed by stamping on the side of the second support piece 144 towards the extension plate 134, and the snap groove 144*b* does not form a protruding structure from the outer side of the mounting plate 136, which maintains the smooth appearance of the hinge 100. In addition, as shown in FIG. 10, The snap groove 144*b* may also be provided on an edge of the first support piece 114, and the snap groove 144*b* is arranged corresponding to a lateral edge of one of the extension plates 134.

The above angle values are for example only and is not intended to limit the angle in this disclosure. Specifically, the hinge 100 can be provided with a plurality of snap grooves 144*b*, so that both lateral edges of the extension plate 134 can be snapped into a corresponding snap groove 144*b*, to improve the effect of positioning. Each of the two first support pieces 114 is provided with a limiting extension portion 116 extending towards the accommodation area 110*a* to stop the extension plate 134, so as to limit the opening angle of the swivel bracket 130. In addition, In the case where the hinge 100 includes a plurality of snap grooves 144*b*, each snap groove 144*b* is provided for a distinct predetermined angle, such that the swivel bracket 130 can be positioned at different predetermined angles.

Through the above technical solution, the hinge 100 of this disclosure has the feature of simple structure and small volume, which is conducive to reducing the production cost.

Meanwhile, this positioning or angular limitation structure is configured on the inner surface of the mounting plate 136 or disposed in the accommodation area 110*a*. The angular limitation structure will not become a protruding structure on the outer surface of the mounting plate 136, which facilitates the installation of the mounting plate 136 onto the door panel 220.

What is claimed is:

1. A hinge, comprising:

a first fixing bracket, including two first support pieces and a first connection piece; wherein The two first support pieces are arranged in parallel to each other, and the first connection piece is connected to the two first support pieces; wherein the two first support pieces are respectively provided with a shaft hole and the shaft holes are arranged coaxially along a central axis; wherein at least one of the first support pieces is provided with a limiting extension portion extending in a direction in parallel to the central axis at an upper front end of the first support piece and extending towards the other first support piece;

a shaft, inserted into the shaft holes to pass through the two first support piece; and a swivel bracket, including:

a mounting plate, including an inner surface, an outer surface, and a bottom edge;

an extension plate, extending from the bottom edge of the mounting plate and bent towards a side corresponding to the inner surface; and at least one sleeve piece, located between the two first support pieces, extending from an end of the extension plate away from the bottom edge, and wound at a side corresponding to the inner surface; wherein the sleeve piece is configured to be sleeved over the shaft, such that the swivel bracket can rotate with respect to the first fixing bracket, when the swivel bracket is flipped outwards with respect to the first fixing bracket, the extension plate moves towards the limiting extension portion.

2. The hinge as claimed in claim 1, wherein the first connection piece is perpendicular to the two first support pieces and connected to a rear edge of the two second support pieces.

3. The hinge as claimed in claim 1, wherein the limiting extension portion is located on an outer side of the central axis with respect to that central axis.

4. The hinge as claimed in claim 1, wherein each of the two first support pieces is provided with one limiting extension portion and the two limiting extension portions respectively extend towards the other first support piece.

5. The hinge as claimed in claim 1, further comprising at least one second fixing bracket, combined with the first fixing bracket; wherein the at least one second fixing bracket includes two second support pieces and a second connection piece; the two second support pieces are arranged in parallel, the second connection piece is connected to the two second support pieces; and one of the two second support pieces is adjacent to one of the first support pieces.

6. The hinge as claimed in claim 5, wherein each of the two second support pieces is respectively provided with a shaft hole and the shaft holes of the second support pieces are arranged coaxially with the shaft holes of the two first support pieces; and the shaft is also inserted into the shaft holes of the two second support pieces.

7. The hinge as claimed in claim 6, wherein the swivel bracket includes a plurality of extension plates with a plurality of corresponding sleeve pieces; each of the extension plates are arranged in parallel to each other and extends from the bottom edge, and each of the sleeve pieces extends from an end of the corresponding extension plate away from the bottom edge; and each of the sleeve pieces is respectively located between the two first support pieces, or located between the two second support pieces, and each of the sleeve pieces is configured to be sleeved over the shaft.

8. The hinge as claimed in claim 7, wherein an open slot is formed between two adjacent ones of the extension plates, and the open slot is configured for the insertion of the first support piece and the second support piece adjacent to each other.

9. The hinge as claimed in claim 5, wherein at least one of the first support pieces or at least one of the second support pieces is provided with at least one snap groove at an edge of the first support piece or the second support piece, the at least one snap groove is arranged corresponding to a lateral edge of the extension plate; when the swivel bracket is flipped outwards to a predetermined angle, the lateral edge of the at least one extension plate is snapped into the at least one snap groove.

10. The hinge as claimed in claim 5, wherein the first fixing bracket includes at least one horizontal fixing piece, extending from a bottom of one of the first support pieces and extending towards an outer side of the first fixing bracket; wherein the second connection piece of the second fixing bracket is configured to be fixed to the at least one horizontal fixing piece.

11. The hinge as claimed in claim 10, wherein the second connection piece is perpendicular to the two second support pieces, extends from a bottom of the two second support pieces, and is arranged in parallel to the at least one horizontal fixing piece.

12. The hinge as claimed in claim 1, wherein when the swivel bracket is closed to the first fixing bracket, the mounting plate abuts against a top portion of the two first support pieces.

13. The hinge as claimed in claim 1, wherein the first fixing bracket includes two horizontal fixing pieces extending from a bottom of each of the two first support pieces and the two horizontal fixing pieces extend away from each other and extend towards outer sides of the first fixing bracket.

* * * * *